US012607502B2

(12) United States Patent
Seo et al.

(10) Patent No.: US 12,607,502 B2
(45) Date of Patent: Apr. 21, 2026

(54) CLAMSHELL-TYPE ELECTRONIC DEVICE CAPABLE OF DETECTING LIGHT SOURCE AND ILLUMINANCE

(71) Applicant: Samsung Electronics Co., Ltd., Suwon-si (KR)

(72) Inventors: Dongil Seo, Suwon-si (KR); Yongkwan Kim, Suwon-si (KR); Dongyoul Park, Suwon-si (KR); Hyeonseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/956,718

(22) Filed: Nov. 22, 2024

(65) Prior Publication Data

US 2025/0085161 A1    Mar. 13, 2025

Related U.S. Application Data

(63) Continuation of application No. PCT/KR2023/005461, filed on Apr. 21, 2023.

(30) Foreign Application Priority Data

Jun. 2, 2022    (KR) ........................ 10-2022-0067584
Aug. 26, 2022    (KR) ........................ 10-2022-0107842

(51) Int. Cl.
*G01J 1/42*        (2006.01)
*G06F 1/16*        (2006.01)
(Continued)

(52) U.S. Cl.
CPC .......... *G01J 1/4204* (2013.01); *G06F 1/1616* (2013.01); *G09G 5/10* (2013.01);
(Continued)

(58) Field of Classification Search
CPC .... G01J 1/4204; G06F 1/1616; G06F 1/1652; G06F 1/1677; G06F 1/1681;
(Continued)

(56) References Cited

U.S. PATENT DOCUMENTS 8,130,235 B2    3/2012    Marcinkiewicz
8,531,386 B1    9/2013    Kerr et al.
(Continued)

FOREIGN PATENT DOCUMENTS

CN    108494974 A    9/2018
CN    112637394 A    4/2021
(Continued)

OTHER PUBLICATIONS

International Search Report dated Jul. 27, 2023, issued in International Patent Application No. PCT/KR2023/005461.
1 European Search Report dated Jul. 21, 2025, issued in European Application No. 23816222.6.
European Office Action dated Jan. 30, 2026, issued in European Application No. 23816222.6.

*Primary Examiner* — Rodney Amadiz
(74) *Attorney, Agent, or Firm* — Jefferson IP Law, LLP

(57)                ABSTRACT

A clamshell-type electronic device is provided. The clamshell-type electronic device includes a housing of which a state is switchable between a folded state and an unfolded state and which includes a common hole, a main display disposed on a first surface of the housing and transformable depending on the state of the housing, a sub-display disposed on a second surface of the housing, a camera disposed in the housing and including a flash, an optical proximity sensor disposed in the housing and configured to sense light entering an inside of the housing, an optical sensor disposed in the housing and including a plurality of light receiving elements configured to sense light entering the inside of the housing, memory storing one or more computer programs, and one or more processors communicatively coupled to the optical sensor and the memory, wherein the one or more (Continued)

computer programs include computer-executable instructions that, when executed by the one or more processors individually or collectively, cause the clamshell-type electronic device to obtain at least one of ambient brightness information and ambient light source information based on light information received from the optical sensor.

14 Claims, 13 Drawing Sheets

(51) Int. Cl.
　　　*G09G 5/10* 　　　　(2006.01)
　　　*H04N 23/88* 　　　　(2023.01)
(52) U.S. Cl.
　　　CPC ............... *G09G 2320/0626* (2013.01); *G09G 2360/144* (2013.01); *H04N 23/88* (2023.01)
(58) Field of Classification Search
　　　CPC ................................ G06F 1/1686; G09G 5/10; G09G 2320/0626; G09G 2360/144; H04N 23/88; H04N 23/6812; H04N 23/684; H04M 2250/12; H04M 2250/52; H04M 1/02; H04M 1/0214; H04M 1/0264
　　　See application file for complete search history.

(56) References Cited

U.S. PATENT DOCUMENTS

| | | | |
|---|---|---|---|
| 8,536,511 B2 * | 9/2013 | Tam ...................... | G01J 1/4204 |
| | | | 250/226 |
| 10,841,412 B2 | 11/2020 | Chug et al. | |
| 2007/0139405 A1 | 6/2007 | Marcinkiewicz | |
| 2020/0022239 A1 | 1/2020 | Hung et al. | |
| 2020/0228770 A1 | 7/2020 | Yu | |
| 2021/0082372 A1 * | 3/2021 | Hur .......................... | G09G 5/10 |
| 2021/0325242 A1 | 10/2021 | Chen | |
| 2022/0382335 A1 * | 12/2022 | Suzuki ................. | G01J 1/4228 |

FOREIGN PATENT DOCUMENTS

| | | |
|---|---|---|
| EP | 3 920 521 A1 | 12/2021 |
| KR | 10-2010-0044711 A | 4/2010 |
| KR | 10-2011-0067973 A | 6/2011 |
| KR | 10-2017-0140976 A | 12/2017 |
| KR | 10-2018-0113421 A | 10/2018 |
| KR | 10-2021-0094956 A | 7/2021 |
| KR | 10-2022-0039014 A | 3/2022 |
| KR | 10-2022-0132964 A | 10/2022 |

* cited by examiner

CLAMSHELL-TYPE ELECTRONIC DEVICE CAPABLE OF DETECTING LIGHT SOURCE AND ILLUMINANCE

CROSS-REFERENCE TO RELATED APPLICATION(S)

This application is a continuation application, claiming priority under § 365(c) of an International application No. PCT/KR2023/005461, filed on Apr. 21, 2023, which is based on and claims the benefit of a Korean patent application number 10-2022-0067584, filed on Jun. 2, 2022, in the Korean Intellectual Property Office, and of a Korean patent application number 10-2022-0107842, filed on Aug. 26, 2022, in the Korean Intellectual Property Office, the disclosures of each of which is incorporated by reference herein in its entirety.

BACKGROUND

1. Field

The disclosure relates to a clamshell-type electronic device that is able to detect a light source and illuminance.

2. Description of Related Art

With the significant development of information communication and semiconductor technology, the spread and use of various electronic devices have rapidly increased. Specifically, recent electronic devices are portable, may perform communication, and may include one or more sensors to obtain ambient information. The sensor of the electronic device may obtain various pieces of information and a sensor type may vary depending on the information to be obtained.

The electronic device may include at least one of a camera sensor, an ultraviolet (UV) sensor, an iris sensor, a spectral sensor, an infrared sensor, a red, green, and blue (RGB) sensor, an illuminance sensor, and/or a flicker sensor.

The electronic device may be implemented in a clamshell type. The electronic device may be folded in one direction. The electronic device may include a main display functioning in an unfolded state and a sub-display functioning in a folded state.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a clamshell-type electronic device that is able to detect a light source and illuminance.

Additional aspects will be set forth in part in the description which follows and, in part, will be apparent from the description, or may be learned by practice of the presented embodiments.

In accordance with an aspect of the disclosure, a clamshell-type electronic device capable of detecting a light source and illuminance is provided. The clamshell-type electronic device includes a housing of which a state is switchable between a folded state and an unfolded state and which may include a common hole, a main display disposed on a first surface of the housing and transformable depending on the state of the housing, a sub-display disposed on a second surface of the housing, a camera disposed in the housing and including a flash, an optical proximity sensor disposed in the housing and configured to sense light entering an inside of the housing, an optical sensor disposed in the housing and including a plurality of light receiving elements configured to sense light entering the inside of the housing, memory storing one or more computer programs, and one or more processors communicatively coupled to the optical sensor and the memory, wherein the one or more computer programs include computer-executable instructions that, when executed by the one or more processors individually or collectively, cause the clamshell-type electronic device to obtain at least one of ambient brightness information and ambient light source information based on light information received from the optical sensor.

In accordance with another aspect of the disclosure, a clamshell-type electronic device capable of detecting a light source and illuminance is provided. The clamshell-type electronic device includes a housing of which a state is switchable between a folded state and an unfolded state and which may include a common hole, a main display disposed on a first surface of the housing and transformable depending on the state of the housing, a sub-display disposed on a second surface of the housing, an optical proximity sensor disposed in the housing and configured to sense light entering an inside of the housing, an optical sensor disposed in the housing and including a plurality of light receiving elements configured to sense light entering the inside of the housing, and a processor electrically connected to the optical sensor and configured to obtain at least one of ambient brightness information and ambient light source information based on light information received from the optical sensor.

In accordance with another aspect of the disclosure, a clamshell-type electronic device capable of detecting a light source and illuminance is provided. The clamshell-type electronic device includes a housing of which a state is switchable between a folded state and an unfolded state and which may include a common hole, a main display disposed on a first surface of the housing and transformable depending on the state of the housing, a sub-display disposed on a second surface of the housing, a camera disposed in the housing and including a flash, an optical proximity sensor disposed in the housing and configured to sense light entering an inside of the housing, an optical sensor disposed in the housing and including a plurality of light receiving elements configured to sense light entering the inside of the housing, a processor electrically connected to the optical sensor and configured to obtain at least one of ambient brightness information and ambient light source information based on light information received from the optical sensor, and a sensor hub electrically connected to the optical sensor, the sub-display, and the processor and configured to obtain the ambient light source information and the ambient brightness information based on the light information received from the optical sensor.

A clamshell-type electronic device detects a light source and illuminance. Specifically, a clamshell-type electronic device determines a type of a light source through a flicker sensor and senses an intensity of the illuminance.

A clamshell-type electronic device adjusts the brightness of an always-on display (AOD) through a sensor hub that is separately provided even if a processor is not operating. The clamshell-type electronic device implements a brightness adjustment function for the AOD and operates in a low-power environment without including a separate hole in a rear surface of the clamshell-type electronic device.

In accordance with another aspect of the disclosure, one or more non-transitory computer-readable storage media storing one or more computer programs including computer-executable instructions that, when executed by one or more processors of a clamshell-type electronic device individually or collectively, cause the clamshell-type electronic device to perform operations are provided. The operations include obtaining at least one of ambient brightness information and ambient light source information based on light information received from an optical sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

Figure 1:
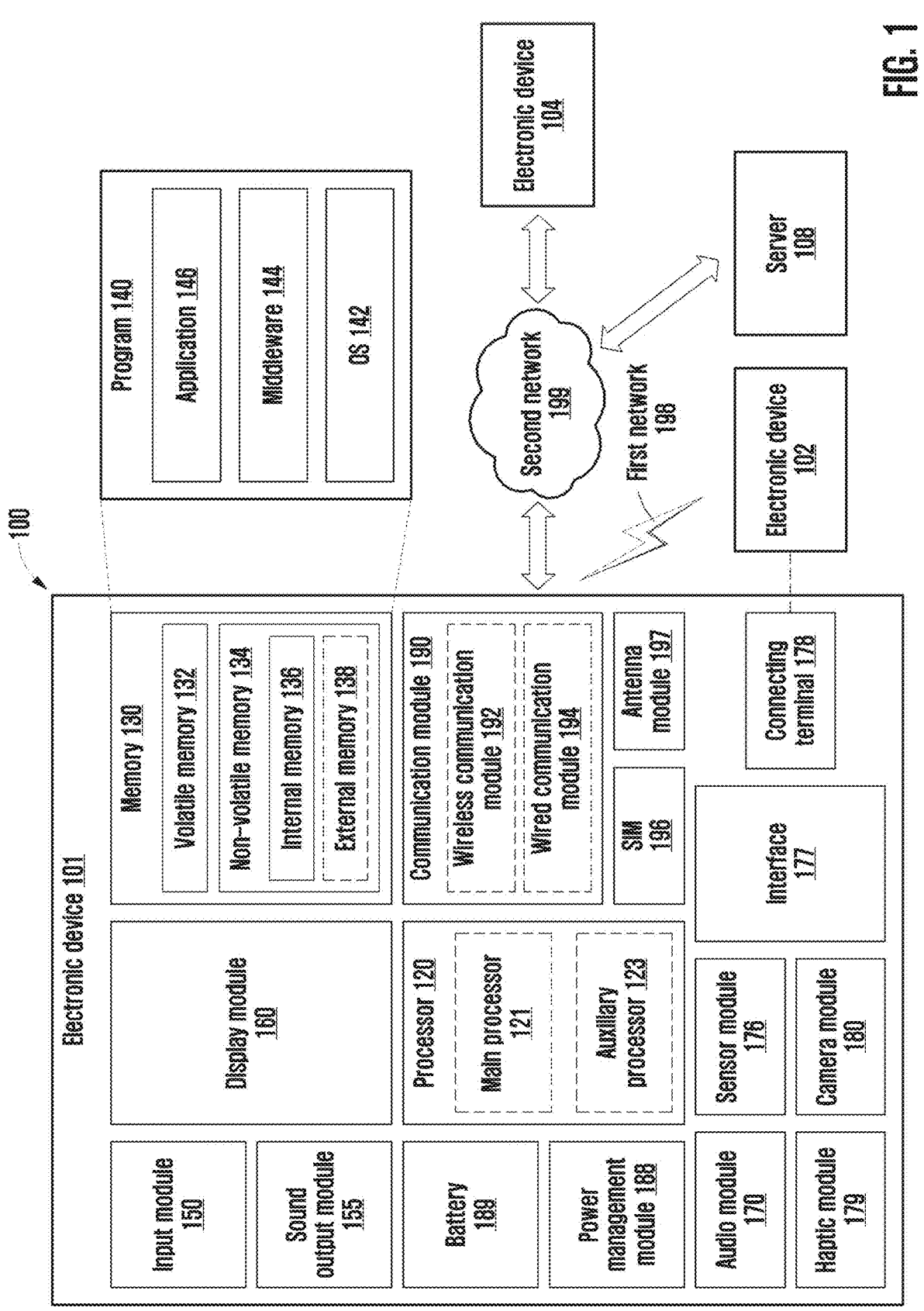
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). In an embodiment, the electronic device 101 may communicate with the electronic device 104 via the server 108. According to one embodiment, the electronic device 101 may include a processor 120, memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. In an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to another embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to another embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. In an embodiment, the speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. In another embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). In an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to another embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. In another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. In an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. In another embodiment, another component (e.g., a radio frequency integrated circuit (RFIC)) other than the radiating element may be additionally formed as a part of the antenna module 197.

According to some embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to another embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To this end, cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more of instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may, for example, include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In one embodiment, a method according to various example embodiments of the disclosure may be included and provided in a computer program product. The computer program product may be traded as a product between a seller and a buyer. The computer program product may be, for example, distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to other embodiments, operations performed by the module, the program, or another component may be carried out sequentially, in parallel, repeatedly, or heuristically, or one or more of the operations may be executed in a different order or omitted, or one or more other operations may be added.

Figure 2:
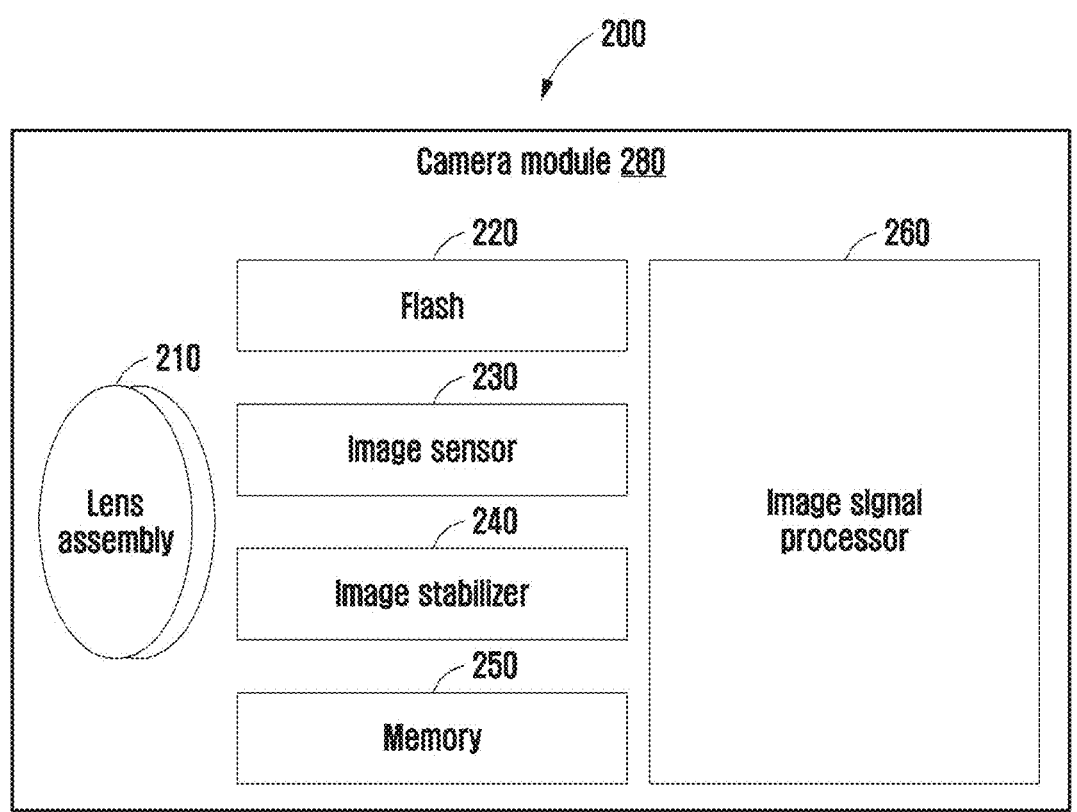
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, a camera module 280 (e.g., a camera module 180 of FIG. 1) may include a lens assembly 210, a flash 220, an image sensor 230, an image stabilizer 240, memory 250 (e.g., a buffer memory), or an image signal processor (ISP) 260.

The lens assembly 210 may collect light emitted from an object which is a target of which an image is to be captured. The lens assembly 210 may include one or more lenses. According to an embodiment, the camera module 280 may include a plurality of lens assemblies 210. In this case, the camera module 280 may constitute, for example, a dual camera, a 360-degree camera, or a spherical camera. A portion of the lens assemblies 210 may have the same lens properties (e.g., an angle of view, a focal length, an auto-focus, an f number, or an optical zoom), or at least one lens assembly may have one or more lens properties that are different from those of another lens assembly. The lens assembly 210 may include, for example, a wide-angle lens or a telephoto lens.

The flash 220 may emit light to be used to enhance light emitted or reflected from the object. According to another embodiment, the flash 220 may include one or more light-emitting diodes (LEDs) (e.g., a red-green-blue (RGB) LED, a white LED, an infrared (IR) LED, or an ultraviolet (UV) LED), or a xenon lamp.

The image sensor 230 may obtain an image corresponding to the object by converting light emitted or reflected from the object and transmitted through the lens assembly 210 into an electrical signal. According to an embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 230 may be implemented using, for example, a charged coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic (e.g., adjust the read-out timing) of the image sensor 230, in response to a movement of the camera module 180 or the electronic device 101 including the camera module 180. This may compensate for at least a portion of a negative effect of the movement on an image to be captured. According to an embodiment, the image stabilizer 240 may sense such a movement of the camera module 280 or the electronic device 101 using a gyro sensor (not shown) or an accelera-tion sensor (not shown) disposed inside or outside the camera module 280. According to another embodiment, the image stabilizer 240 may be implemented as, for example, an optical image stabilizer. The memory 250 may tempo-rarily store therein at least a portion of the image obtained through the image sensor 230 for a subsequent image processing operation. For example, when image acquisition is delayed by a shutter or a plurality of images is obtained at a high speed, an obtained original image (e.g., a Bayer-patterned image or a high-resolution image) may be stored in the memory 250 and a copy image (e.g., a low-resolution image) corresponding the original image may be previewed through the display module 160. Subsequently, when a specified condition (e.g., a user input or a system command) is satisfied, at least a portion of the original image stored in the memory 250 may be obtained and processed by, for example, the ISP 260. The memory 250 may be configured as at least part of the memory 130 or as a separate memory operated independently of the memory 130.

The ISP 260 may perform one or more image processing operations on an image obtained through the image sensor 230 or an image stored in the memory 250. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening.

Additionally or alternatively, the ISP 260 may control at least one of the components (e.g., the image sensor 230) included in the camera module 280. For example, the ISP 260 may control an exposure time, a read-out timing, and the like. The image processed by the ISP 260 may be stored again in the memory 250 for further processing, or be provided to an external component (e.g., the memory 130, the display module 160, the electronic device 102, the electronic device 104, or the server 108) of the camera module 280 (e.g., the camera module 180 of FIG. 1). In an embodiment, the ISP 260 may be configured as at least part of a processor (e.g., the processor 120 of FIG. 1) or as a separate processor operated independently of the processor. When the ISP 260 is configured as a processor separate from the processor, at least one image processed by the ISP 260 may be displayed as it is without a change or be displayed through a display module (e.g., the display module 160 of FIG. 1) after additional image processing is performed by the processor.

According to another embodiment, an electronic device (e.g., the electronic device 101 of FIG. 1) may include a plurality of camera modules 280 having different properties or functions. In this case, for example, at least one of the camera modules 280 may be a wide-angle camera, and at least another one of the camera modules 280 may be a telephoto camera. Similarly, at least one of the camera modules 280 may be a front camera, and at least another one of the camera modules 280 may be a rear camera.

Figure 3:
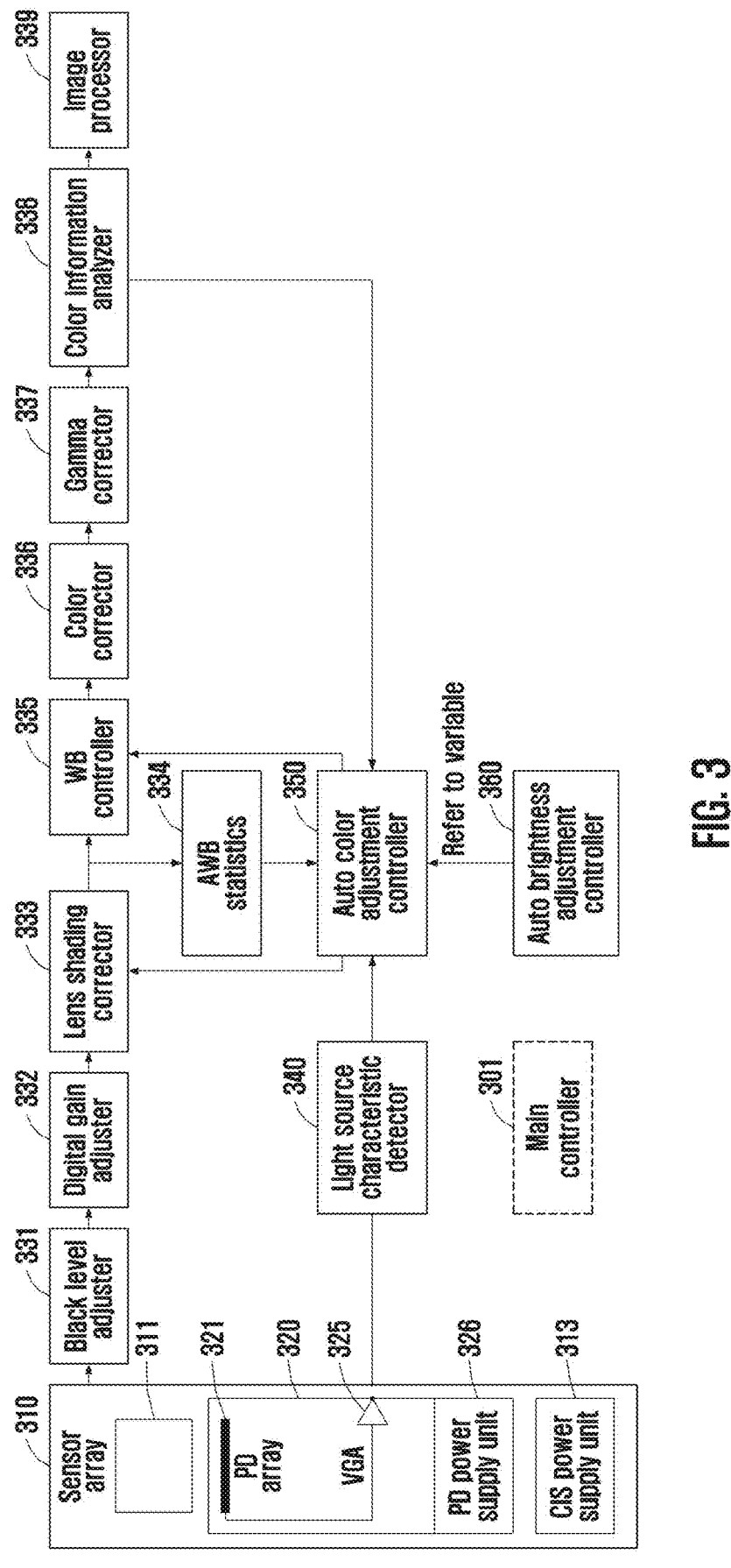
FIG. 3 is a block diagram illustrating a configuration of an image processing apparatus according to an embodiment of the disclosure.

FIG. 3 is a block diagram illustrating a configuration of an image processing apparatus according to an embodiment of the disclosure.

Referring to FIG. 3, a camera module (e.g., a camera module 180 of FIG. 1 or a camera module 280 of FIG. 2) according to various example embodiments includes a main controller 301, an image sensor module 310, a light receiv-ing module 320, a black level adjuster 331, a digital gain adjuster 332, a lens shading corrector 333, an (auto white balance) AWB statistics extractor 334, a white balance (WB) controller 335, a color corrector 336, a gamma corrector 337, a color information analyzer 338, an image processor 339, a light source characteristic detector 340, an auto color adjustment controller 350, and an auto brightness adjust-ment controller 360.

In various embodiments, the main controller 301 may be connected to the image sensor module 310, the light receiv-ing module 320, the black level adjuster 331, the digital gain adjuster 332, the lens shading corrector 333, the AWB statistics extractor 334, the WB controller 335, the color corrector 336, the gamma corrector 337, the color informa-tion analyzer 338, the image processor 339, the light source characteristic detector 340, and the auto color adjustment controller 350, and may control the whole drive. Specifi-cally, the main controller 301 may provide a control signal for controlling an operating power of each functional unit, a timing signal of the image sensor arranged by the unit of a pixel, a sensor control signal, etc.

In some embodiments, the image sensor module 310 may convert a light signal projected through a camera lens into an electrical signal and may generate an image signal (e.g., a video signal) to express a color of each pixel included in the image. Herein, image signals may indicate output values (R, G, and B) in the unit of a pixel of the image sensor module 310, and the image may be an image formed by combining the image signals of the unit of the pixel. For example, the image may be a frame included in a picture or a dynamic image. It shall be noted that the output value in the unit of pixel is not limited to R, G, and B.

In various embodiments, the image sensor module 310 may include an image sensor array 311 including a plurality of image sensors suitably arranged for the resolution of the image, and a power supply unit 313 configured to supply the operating power of the image sensor module 310. The image sensor array 311 may be, for example, controlled by the timing signal and the sensor control signal, and the image signal of the image sensor array 311 may be output to the black level adjuster 331, according to the timing signal.

In various embodiments, the black level adjuster 331 may receive an input of an offset corresponding to a black level adjustment value to perform the black level adjustment for the image signal. The black level may be adjusted through compensation by an exposure time or by a generalized equation after forcibly subtracting the offset from the image signals (R, G, and B). In another example, the black level for the image signals (R, G, and B) may be adjusted by a predetermined adjustment table. Meanwhile, the offset may be determined by a premeasured black level. The black level may be measured by the image signal output in a state where the light is shaded so that it is not incident through the lens.

In various embodiments, the image signal, for which the black level has been adjusted, may be input to the digital gain adjuster 332, and the digital gain adjuster 332 may control the brightness such that the brightness of the image signal, for which the black level has been adjusted, remains constant by using an Auto Exposure (AE) algorithm.

In other embodiments, the lens shading corrector 333 may be a block for correcting a lens shading phenomenon, in which light amounts of a center area and an edge area of the image are different from each other, and may receive an input of a lens shading setting value from the auto color adjustment controller to correct colors of the center area and the edge area of the image. The lens shading corrector 333 may receive shading variables that are set differently according to the types of the light sources from the auto color adjustment controller 350, and may process the lens shading of the image to correspond to the received variables. Therefore, the lens shading corrector 333 may perform the lens shading processing by applying a different degree of the shading according to the types of the light sources.

In still other embodiments, the AWB statistics extractor 334 may extract a statistical value required for an auto color adjustment algorithm from the image and then may provide the auto color adjustment controller 350 with the statistical value, to correspond to the WB of the image.

In some embodiments, the WB controller 335 may control a gain level of the image signal such that a white object may be reproduced as an exact white color. The WB controller 335 may perform a correction of the WB by multiplying the signals R, G, and B of the image signal by gain values (gain G (GG), gain R (GR), and gain B (GB)), respectively. The gain values (GR, GG, and GB) may be determined by the auto color adjustment controller 350.

The color corrector 336 may perform a color correction of an input image signal through an operation of a color correction matrix. In other words, the color corrector 336 may reconstruct colors of a captured image by removing interference between R, G, and B channels from the R, G, and B channel signals input to the image sensor through an operation using Equation 1 below.

$$\begin{pmatrix} R' \\ G' \\ B' \end{pmatrix} = CCM \begin{pmatrix} R \\ G \\ B \end{pmatrix} \qquad \text{Equation 1}$$

In Equation 1, R, G, and B are outputs for each channel of red, green, and blue of the image sensor, R', G', and B' are signals for each channel of red, green, and blue, in which the interference between the channels of R, G, and B is minimized, and CCM is a Color Correction Matrix that is a 3×3 matrix having a minimized interference between the R, G, and B channels.

A gamma is a measure indicating a state of a contrast and refers to an inclination of a characteristic curve, specifically, a change in concentration/a change in an exposure amount. Further, a display device such as a Cathode Ray Tube (CRT) has a non-linear relation between an electric beam current and an input voltage of the image signal, and a linear relation between the beam current and the brightness of the image. That is, the brightness of the image for the input voltage of the image signal is non-linear. The gamma corrector 337 performs, for example, a gamma correction for the standard image signal in consideration of the non-linear characteristic of the display device so that a final image signal has a linear characteristic. The gamma corrector 337 corrects the non-linear characteristic of the display device.

In various embodiments, the image processor 339 forms an image from an image signal by performing image processing on the image signal. The formed image is displayed through a display or stored in memory.

In other embodiments, the light receiving module 320 included in the image apparatus is arranged close to the image sensor module 310, particularly close to the image sensor array 311, and detects an optical signal of an external light source. The optical signal detected by the light receiving module 320 is output to the light source characteristic detector 340 to be used for analysis of the light source characteristic. Specifically, the light receiving module 320 includes at least a plurality of light receiving elements 321, a variable gain amplifier (VGA) 325 for controlling a gain of an output value of the plurality of light receiving elements 321, and a power supply unit 326 for supplying an operating power of the light receiving module 320.

When illuminance is measured by using the light detected by the plurality of light receiving elements 321, the light receiving module 320 may measure the illumination intensity of a visible light area separately. For example, the light receiving module 320 may further include an optical filter for passing a wavelength of the visible light area at a front end of a portion of the plurality of light receiving elements 321 to detect the illuminance of the visible light area. The optical filter directly coats the light receiving elements 321 or is provided as a separate structure. Further, although the light receiving module 320 detects the illumination intensity of the visible light area in an example embodiment, the light receiving module 320 is not limited thereto. For example, the light receiving module 320 may detect the illumination intensity of an infrared light area. Accordingly, the light receiving module 320 may further include an optical filter for passing a wavelength of the infrared light area at a front end of the light receiving elements 321.

Figures 4A, 4B:
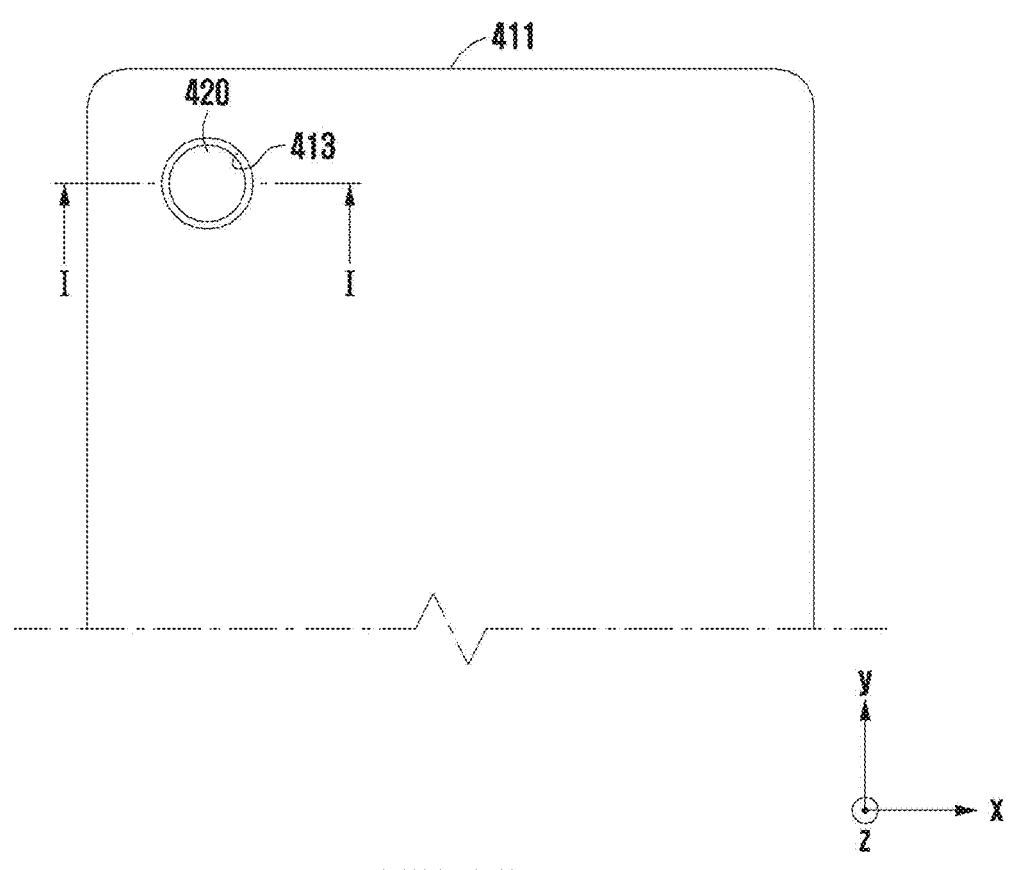
FIG. 4A is a rear view illustrating a rear surface of a device for simultaneously performing a lighting function and a light source detection function (hereinafter, referred to as a "light source detection device") through a common hole according to an embodiment of the disclosure.
FIG. 4B is a cross-sectional view taken along a line I-I of FIG. 4A according to an embodiment of the disclosure.

FIG. 4A is a rear view illustrating a rear surface of a device for simultaneously performing a lighting function and a light source detection function through a common hole (hereinafter, referred to as a "light source detection device") through a common hole according to an embodiment of the disclosure.

Figure 4C:
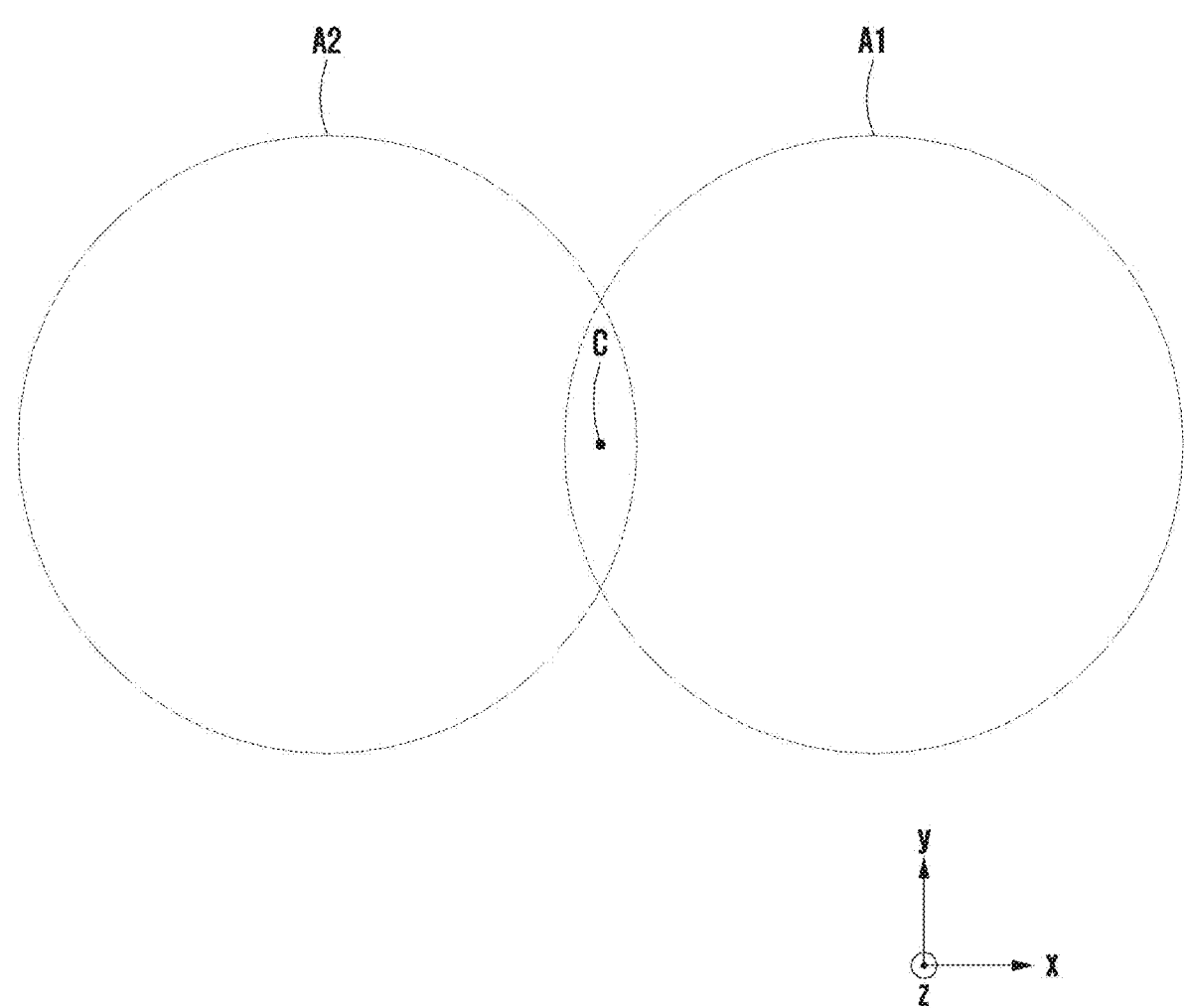
FIG. 4C is a diagram schematically illustrating light receiving areas of a plurality of light receiving elements according to an embodiment of the disclosure.

FIG. 4B is a cross-sectional view taken along a line I-I of FIG. 4A according to an embodiment of the disclosure. FIG. 4C is a diagram schematically illustrating light receiving areas of a plurality of light receiving elements according to an embodiment of the disclosure.

Referring to FIGS. 4A to 4C, a light source detection device may detect an external light source and determine a type and/or a position of the external light source. The light source detection device may be, for example, one component of the sensor module 176 of FIG. 1. The light source detection device may have a function to detect an external light source and a lighting function. The light source detection device may, for example, determine the type and/or the position of the external light source by analyzing light from the external light source while lighting the outside through a flash.

In various embodiments, the light source detection device may include a cover 410, a main condensing lens 420 connected to the cover 410, an interposer 490 arranged inside of the cover 410, a PCB 430 arranged on the interposer 490, a flash 440 (e.g., the flash 220 of FIG. 2) arranged on the PCB 430, a plurality of light receiving elements 451 and 452 (e.g., the plurality of light receiving elements 321), and an adhesive layer 491 for connecting the main condensing lens 420 to an inner surface of the cover 410.

The cover 410 may form an exterior of an electronic device (e.g., the electronic device 101 of FIG. 1). The cover 410 may include a back cover 411 and a front cover 412 that are coupled to each other, and a common hole 413 formed through the back cover 411. The back cover 411 may form a rear side of the electronic device, and the front cover 412 may form a front side of the electronic device. A display module (e.g., the display module 160 of FIG. 1) and a camera module (e.g., a lens of a front camera of the plurality of camera modules 280 of FIG. 2) may be disposed on the front cover 412. A camera module (e.g., a rear camera among the plurality of camera modules 208 of FIG. 2) and a flash (e.g., the flash 220 of FIG. 2) may be arranged on the back cover 412.

In other embodiments, the back cover 411 and the front cover 412 may be separately manufactured in a decoupled state. The back cover 411 and the front cover 412 may be coupled in a state in which all the components of the electronic device are assembled. For example, all the components may be arranged in the front cover 412 and then, the back cover 411 may be coupled to the front cover 412. As another example, all the components may be arranged in the back cover 411 and then, the front cover 412 may be coupled to the back cover 411. As another example, the cover 410 may be integrally formed.

The common hole 413 may provide a path to the flash 440 to emit light to the outside. The common hole 413 may provide a path through which the plurality of light receiving elements 451 and 452 may receive light from the outside. In other words, the light source detection device may perform the lighting function through the common hole 413 and simultaneously perform the light source detection function through the common hole 413. The common hole 413 is illustrated in a circular shape, but the shape of the common hole 413 is not limited thereto. The common hole 413 may have, for example, an elliptical shape or a polygonal shape. A central axis C of the common hole 413 refers to an imaginary line passing through the center of the common hole 413 and facing a height direction (z-axis direction) of the light source detection device. When the common hole 413 has a circular shape, the center of the common hole 413 corresponds to the center of the circle. When the common hole 413 has an elliptical shape, the center of the common hole 413 corresponds to the center of two focal points. When the common hole 413 is a polygon, the center of gravity of the polygon is referred to as the center of the common hole 413.

In still other embodiments, the main condensing lens 420 may assist with the radiation of light from the flash 440 to the outside in a wide range. The main condensing lens 420 may assist with the effective reach of light from the external light source to the plurality of light receiving elements 451 and 452. For example, the main condensing lens 420 may be a Fresnel lens including continuous concentric grooves etched into plastic. For example, a center (e.g., the innermost concentric groove) of the main condensing lens 420 may be parallel to the central axis C of the common hole 413. The main condensing lens 420 may be attached to the cover 410 while maintaining a distance L1 from the flash 440, or may be directly attached to the flash 440.

In various embodiments, the main condensing lens 420 may be connected to the cover 410 to cover the common hole 413 from the inside. The main condensing lens 420 may include a core part electronic device inserted into the common hole 413, and a flange part 422 provided on a lower side of the core part 421, having a larger diameter than the core part 421, and facing the inner surface of the back cover 411. The adhesive layer 491 may attach the flange part 422 to the back cover 411. The adhesive layer 491 may be formed in a ring shape. The adhesive layer 491 may, for example, implement sealing to prevent water or a foreign substance from entering from the outside into the inner side of the cover 410.

In various embodiments, the interposer 490 may be provided inside the cover 410. For example, the interposer 490 may be arranged on the inner surface of the front cover 410 and face a bottom surface of the main condensing lens 420. The interposer 490 may include a power supply for supplying power to the flash 440 and the plurality of light receiving elements 451 and 452, a controller for controlling the flash 440, a VGA (e.g., the VGA 325 of FIG. 3) for controlling a gain of an output value of the plurality of light receiving elements 451 and 452, and a processor (e.g., the light source characteristic detector 340) for processing information about light received from the plurality of light receiving elements 451 and 452.

The PCB 430 may be disposed on a top surface of the interposer 490. The PCB 430 may support the flash 440 and the plurality of light receiving elements 451 and 452 which will be described later. The PCB 430 may include a plurality of connection lines for electrically connecting to the various components provided in the interposer 490. The PCB 430 may be a silicon wafer, but is not limited thereto.

In various embodiments, the flash 440 (e.g., the flash of FIG. 2) may generate and emit light to the outside to brighten the outside. The flash 440 may be disposed on the PCB 430. The distance L1 between the top surface of the flash 440 and the bottom surface of the main condensing lens 420 may act as a factor for increasing the performance of the flash 440. The distance L1 may be set, for example, in the range of 0.2 mm to 0.8 mm. The top surface of the flash 440 and the bottom surface of the main condensing lens 420 may be in contact with each other. By designing the interposer 490 at an appropriate height, the distance between the flash 440 and the main condensing lens 420 may be set. By arranging the power supply, the controller, the VGA, and the processor in the interposer 490 for setting the distance between the flash 440 and the main condensing lens 420, the light source detection device may be implemented to be more compact.

In various embodiments, the flash 440 may be provided in parallel with the central axis C of the common hole 413 to effectively perform a flash function. Here, being parallel indicates that the central axis C of the common hole 413 passes through the flash 440. For example, the center of the flash 440 may be placed at a position through which the central axis C of the common hole 413 passes. By this structure, the light radiated from the flash 440 may pass through the common hole 413 and be symmetrically radiated to the outside.

The plurality of light receiving elements 451 and 452 (e.g., the plurality of light receiving elements 321 of FIG. 3) may receive light from the outside through the common hole 413. The plurality of light receiving elements 451 and 452 may be arranged on the PCB 430. The plurality of light receiving elements 451 and 452 may include a first light receiving element 451 provided at a position spaced apart from the flash 440 in a first direction D1, and a second light receiving element 452 provided at a position spaced apart from the flash 440 in a second direction D2 different from the first direction D1.

In other embodiments, the first light receiving element 451 and the second light receiving element 452 may be arranged symmetrically with respect to the flash 440. For example, the first light receiving element 451 and the second light receiving element 452 may be provided on opposite sides with respect to the flash 440.

In still other embodiments, as the flash 440 is provided in parallel with the central axis C of the common hole 413, the plurality of light receiving elements 451 and 452 may be disposed apart from the central axis C. Even if the plurality of light receiving elements 451 and 452 are arranged at positions spaced apart from the central axis C, the plurality light receiving elements 451 and 452 may secure light receiving areas that are symmetric overall since the first light receiving element 451 and the second light receiving element 452 are arranged on opposite sides with respect to the central axis C. The plurality of light receiving elements may have symmetric angles of view with respect to the central axis C.

Specifically, the first light receiving element 451 may be spaced apart from the central axis C of the common hole 413 in the first direction D1 (−x direction). Since the common hole 413 is biased in the +x direction with respect to the first light receiving element 451, a light receiving area A1 of the first light receiving element 451 may be formed to be biased in the +x direction. As a result, the first light receiving element 451 may receive a relatively large amount of light from an area biased in the +x direction with respect to the central axis C and receive a relatively small amount of light from an area biased in the −x direction with respect to the central axis C.

The second light receiving element 452 may be spaced apart from the central axis C of the common hole 413 in the second direction D2 (+x direction). Since the common hole 413 is biased in the −x direction with respect to the second light receiving element 452, a light receiving area A2 of the second light receiving element 452 may be formed to be biased in the −x direction. As a result, the second light receiving element 452 may receive a relatively large amount of light from the area biased in the −x direction with respect to the central axis C and receive a relatively small amount of light from the area biased in the +x direction with respect to the central axis C.

As the first light receiving element 451 and the second light receiving element 452 are arranged symmetrically with respect to the flash 440, the light receiving areas of the plurality of light receiving elements 451 and 452 may be formed symmetrically with respect to the central axis C of the common hole 413 overall. The light receiving area A1 of the first light receiving element 451 and the light receiving area A2 of the second light receiving element 452 may overlap each other in the vicinity of the central axis C. An area, of the light receiving area A1 of the first light receiving element 451, that does not overlap the light receiving area A2 of the second light receiving element 452 may be formed at a position spaced apart from the central axis C in the +x direction. An area, of the light receiving area A2 of the second light receiving element 452, that does not overlap the light receiving area A1 of the first light receiving element 451 may be formed at a position spaced apart from the central axis C in the −x direction.

Figure 5A:
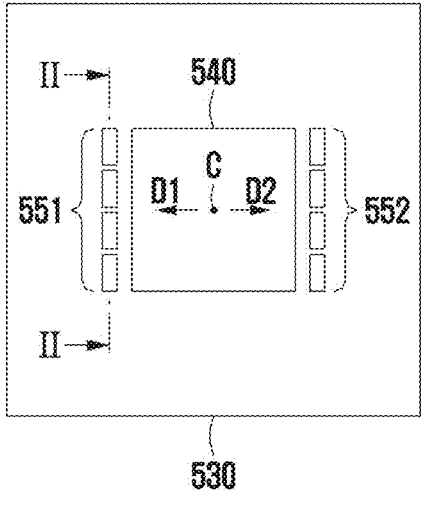
FIG. 5A is a plan view schematically illustrating a printed circuit board (PCB), a flash, and a plurality of light receiving elements according to an embodiment of the disclosure.

FIG. 5A is a plan view schematically illustrating a PCB, a flash, and a plurality of light receiving elements according to an embodiment of the disclosure.

Figure 5B:
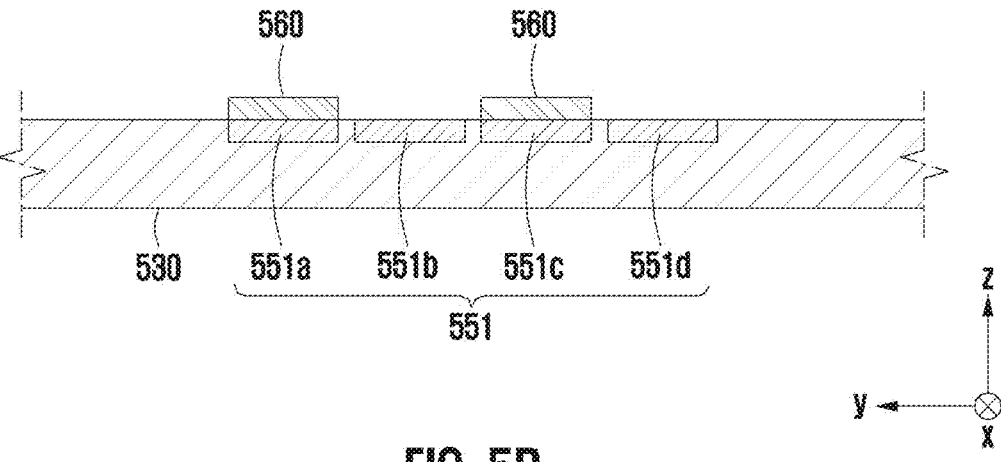
FIG. 5B is a cross-sectional view taken along a line II-II of FIG. 5A according to an embodiment of the disclosure.

FIG. 5B is a cross-sectional view taken along a line II-II of FIG. 5A according to an embodiment of the disclosure.

Figure 5C:
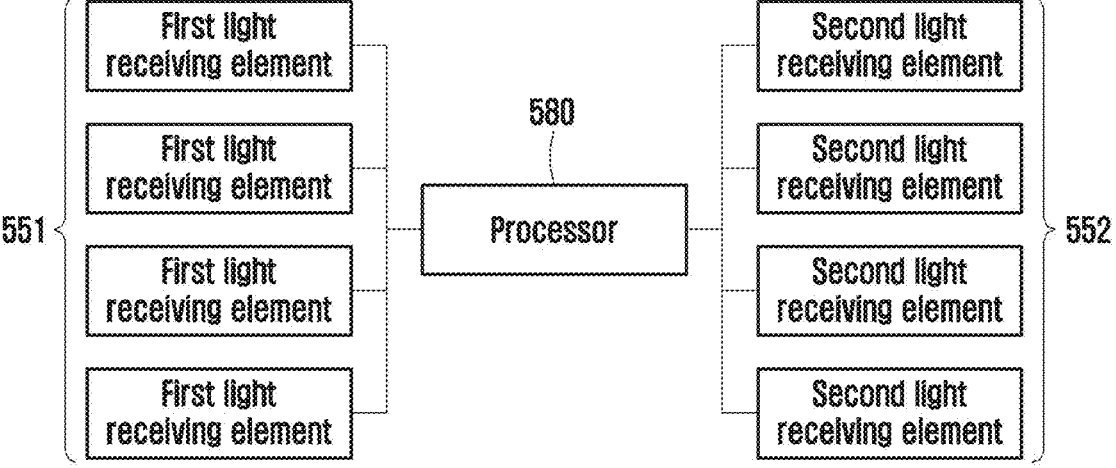
FIG. 5C is a block diagram of a light source detection device according to an embodiment of the disclosure.

FIG. 5C is a block diagram of a light source detection device according to an embodiment of the disclosure.

Referring to FIGS. 5A to 5C, a flash 540 and a plurality of light receiving elements 551 and 552 may be arranged on a PCB 530. The flash 540 may be arranged at a position parallel to a central axis C of a common hole (e.g., a common hole 413 of FIG. 4A). The central axis C may pass through the flash 540.

In various embodiments, the plurality of light receiving elements 551 and 552 may be positioned symmetrically with respect to the flash 540. For example, the first light receiving element 551 and the second light receiving element 552 may be arranged on opposite sides with respect to the flash 540. The first light receiving element 551 may be placed at a position spaced apart from the flash 540 in a first direction D1 (−x direction), and the second light receiving element 552 may be placed at a position spaced apart from the flash 540 in a second direction D2 (+x direction). For example, a distance between each of a plurality of first light receiving elements 551 and the flash 540 may be approximately the same, but is not limited thereto. For example, the distance between each of the plurality of first light receiving elements 551 and the flash 540 may be set individually appropriately. Likewise, a distance between each of a plurality of second light receiving elements 552 and the flash 540 may be approximately the same, but is not limited thereto.

In other embodiments, the flash 540 having a square shape is illustrated, but embodiments are not limited thereto. For example, the flash 540 may have another polygonal shape or a circular shape.

The first light receiving element 551 may be one of a phototransistor, a photodiode, and a photo IC arranged on the PCB 530, and may include any element for receiving light.

A photodiode will be briefly described as follows.

In various embodiments, a photodiode is a typical PN photodiode that is formed on a P-type silicon substrate to convert optical energy into electrical energy and is configured by doping the silicon substrate with a P-type region and an N-type region forming a PN junction.

At this time, to form the PN junction, in the case of a typical bipolar process, the P-type region may be formed as a base, and the N-type region may be formed as N-epi or Emitter, and in the case of a typical CMOS process, the P-type region may be formed as P+ source/drain or P Sub, and the N-type region may be formed as N Well or N+ source/drain.

Similarly, the second light receiving element 552 may be one of a phototransistor, a photodiode, and a photo IC formed on the PCB 530, and may include any element for receiving light. In addition, the first light receiving element may be the same as or different from the second light receiving element.

When signals, which are obtained by converting, into electrical energy, light received by the first light receiving element 551 and the second light receiving element 552 disposed in the PCB 530, are output from the first light receiving element 551 and the second light receiving element 552, metal wires (not shown) may be arranged on the PCB 530 to transmit the output signals to a peripheral circuit, that is, the processor 580. The metal wires may be intended to connect signals among the first light receiving element 551, the second light receiving element 552, and the ambient circuit, for example, the processor 580, and may be formed to connect to a portion of the first light receiving element 551 and a portion of the second light receiving element 552. Of course, the metal wires may be formed in a single layer or in a plurality of layers.

Each of the first light receiving element 551 and the second light receiving element 552 may be provided in plurality. For example, an even number of (e.g., four) first light receiving elements 551 and second light receiving elements 552 may be provided, but the number is not limited thereto. The plurality of first light receiving elements 551 and the plurality of second light receiving elements 552 may be arranged in parallel in the y-axis direction, each in a line. For example, the plurality of first light receiving elements 551 may include four light receiving elements 551*a*, 551*b*, 551*c*, and 551*d* sequentially arranged in the y-axis direction.

In various embodiments, the light source detection device may include a plurality of filters 560 covering a portion of the plurality of light receiving elements 551 and 552. For example, the plurality of filters 560 may cover a portion (e.g., a half) of the plurality of first light receiving elements 551 and cover a portion (e.g., a half) of the plurality of second light receiving elements 552. It should be noted that the filters 560 are not shown in FIG. 5A.

In some embodiments, the filter 560 may receive incident light output from a measured light source and may pass light in a visible band among a wavelength band included in the incident light. That is, the filters may each be a band-pass filter (BPF) that passes light of a wavelength band of 300 to 700 nanometers (nm).

In various embodiments, of the plurality of first light receiving elements 551, the first light receiving elements 551*b* and 551*d* not covered by the filters 560 may receive the incident light output from a light source, that is, a measured light source for which illuminance is to be measured, and output an electrical signal for the received incident light. Here, the incident light refers to light including visible and infrared bands. The first light receiving elements 551*b* and 551*d* not covered by the filters 560 may receive light having a wavelength of 400 to 1000 nm corresponding to the visible band and the infrared band.

In other embodiments, of the plurality of first light receiving elements 551, the first light receiving elements 551*a* and 551*c* covered by the filters 560 may receive light of the visible band for the measured light source passed by the filters 560, and output an electrical signal for the received light of the visible band. The first light receiving elements 551*a* and 551*c* covered by the filters 560 may receive light having a wavelength of 400 to 700 nm corresponding to the visible band.

In various embodiments, of the plurality of first light receiving elements 551, the first light receiving elements 551*a* and 551*c* covered by the filters 560 and the first light receiving elements 551*b* and 551*d* not covered by the filters 560 may be arranged alternately. For example, the first light receiving element 551*a*, the first light receiving element 551*b*, the first light receiving element 551*c*, and the first light receiving element 551*d* may be sequentially arranged. In other words, of the plurality of first light receiving elements 551, a first light receiving element covered by a filter 560 and a first light receiving element not covered by the filter 560 may be paired. The paired two first light receiving elements may be used to obtain a ratio of infrared components.

In various embodiments, the same applies to the plurality of second light receiving elements 552. A portion (e.g., a half) of the second light receiving elements 552 may be covered by the filters 560 and receive light having a wavelength corresponding to the visible band. The other portion (e.g., the other half) of the second light receiving elements 552 may not be covered by the filters 560 and may receive light having a wavelength corresponding to the visible band and the infrared band.

The processor 580 (e.g., the light source characteristic detector 340 of FIG. 3) may calculate an amount CH1 of first light received by the light receiving elements not covered by the filters 560, of the plurality of light receiving elements 551 and 552, an amount CH2 of second light received by the light receiving elements covered by the filters 560, and an index corresponding to the amount CH1 of the first light subtracted by the amount CH2 of the second light, and a ratio of the index to the amount CH1 of the first light.

The processor 580 may calculate a ratio of infrared components in the incident light to the measured light source using electrical signals output from the plurality of first light receiving elements 551, and may determine the type of the measured light source based on the calculated ratio of the infrared components. For example, the processor 580 may determine whether a light source measured in a light receiving area is a fluorescent light, an incandescent light, or sunlight, based on the ratio of the infrared components. For example, sunlight may have a relatively larger ratio of infrared components than an incandescent light, and a fluorescent light may have a relatively smaller ratio of infrared components than an incandescent light.

In various embodiments, the processor 580 may transmit information on the type of the light source to an auto color adjustment controller (e.g., the auto color adjustment controller 350 of FIG. 3).

In other embodiments, the ratio of the infrared components may be calculated, for each light source, by subtracting the amount CH2 of the light received by the first light receiving elements 551*a* and 551*c* covered by the filters 560 from the amount CH1 of the light received by the first light receiving elements 551*b* and 551*d* not covered by the filters 560 and dividing the result value by the amount CH1 of the light received by the first light receiving elements 551*b* and 551*d*. In other words, the ratio of the infrared components may be (CH1−CH2)/CH1.

In some embodiments, for more precise ratio measurement in calculating the ratio of the infrared components, coefficients may be applied respectively to the amount CH1 of the light received by the first light receiving elements 551*b* and 551*d* not covered by the filters 560 and the amount CH2 of the light received by the first light receiving elements 551*a* and 551*c* covered by the filters 560. For example, the ratio of the infrared components may be (a*CH1−b*CH2)/CH1. Here, a and b may be the coefficients applied respectively to CH1 and CH2.

The processor 580 may calculate a ratio of infrared components in the incident light for the measured light source using electrical signals output from the plurality of second light receiving elements 552, and determine the type of the measured light source based on the calculated ratio of the infrared components.

In various embodiments, the processor 580 may separately calculate a ratio of the infrared component to each of the plurality of first light receiving elements 551 and the plurality of second light receiving elements 552. Since a light receiving area of the plurality of first light receiving elements 551 is different from a light receiving area of the plurality of second light receiving elements 552, the processor 580 may, for example, individually determine the type of a light source for each light receiving area. For example, the processor 580 may determine that a light source corresponding to the light receiving area of the plurality of first light receiving elements 551 is an incandescent light and that a light source corresponding to the light receiving area of the plurality of second light receiving elements 552 is sunlight. Through the first light receiving elements 551 and the second light receiving elements 552 that are provided on opposite sides with respect to the flash 540 and have different light receiving areas, the processor 580 may determine the types and positions of the light sources. In this case, AWB may be individually applied to each area. When two or more light sources affect a picture, the processor 580 may provide a consumer with a picture to which a more accurate AWB is applied. For example, when two different light sources exist, the processor 580 may discriminate among an area mainly affected by one of the two different light sources, an area mainly affected by the other one, and an area approximately evenly affected by both the light sources, and perform different AWB for each area.

In various embodiments, the processor 580 may aggregate all pieces of information received by the plurality of first light receiving elements 551 and the plurality of second light receiving elements 552, and determine the types of the light sources in the overall light receiving area, in other words, a light receiving area corresponding to a combination of the light receiving area of the plurality of first light receiving elements 551 and the light receiving area of the plurality of second light receiving elements 552. According to this configuration, the light source detection device may determine the types of light sources for light receiving areas of respective light receiving elements, and also determine the type of a light source in the overall light receiving area of all light receiving elements.

Figure 6A:
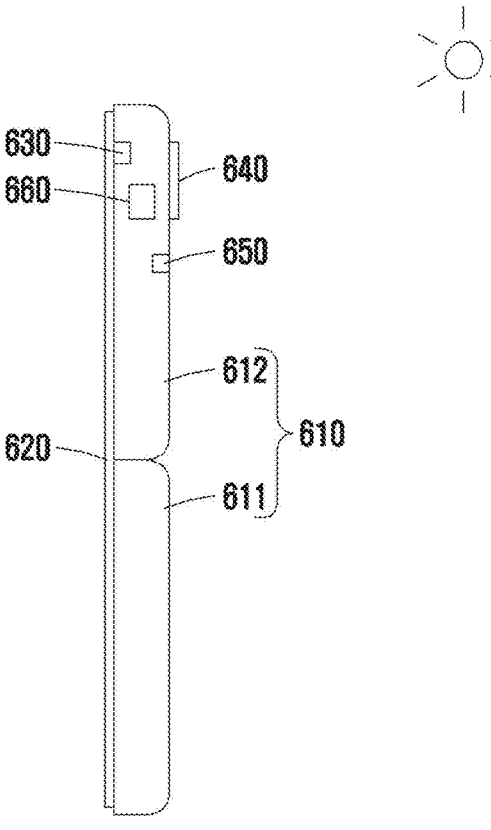
FIG. 6A is a side view schematically illustrating a clamshell-type electronic device in an unfolded state according to an embodiment of the disclosure.

FIG. 6A is a side view schematically illustrating a clamshell-type electronic device in an unfolded state according to an embodiment of the disclosure.

Figure 6B:
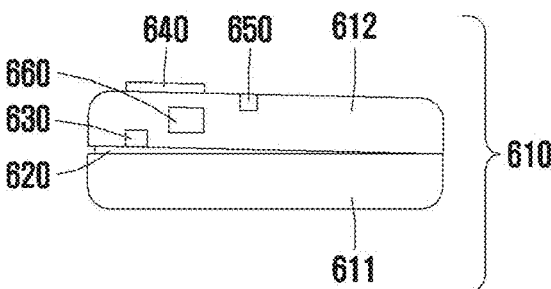
FIG. 6B is a side view schematically illustrating a clamshell-type electronic device in a folded state according to an embodiment of the disclosure.

FIG. 6B is a side view schematically illustrating a clamshell-type electronic device in a folded state according to an embodiment of the disclosure.

Referring to FIGS. 6A and 6B, an electronic device (e.g., an electronic device 101 of FIG. 1) may be a clamshell-type. The electronic device may include a housing 610 of which a state is switchable between a folded state and an unfolded state, a main display 620 disposed on a first surface of the housing 610, a sub-display disposed 640 on a second surface of the housing 610, a camera (e.g., a camera module 180 of FIG. 1) disposed in the housing 610, an optical proximity sensor 630 disposed in the housing 610, an optical sensor 650 disposed in the housing 610, and a processor 660 electrically connected to the optical proximity sensor 630 and the optical sensor 650 and disposed in the housing 610.

In various embodiments, the main display 620 and the sub-display 640 may be disposed opposite to each other relative to the housing 610. Hereinafter, a surface on which the main display 620 is disposed may be referred to as a first surface and a surface on which the sub-display 640 is disposed may be referred to as a second surface. When the housing 610 is in the folded state, the first surface may be an inner side surface and the second surface may be an outer side surface.

In various embodiments, the housing 610 may accommodate various components of the electronic device. The housing 610 may form an exterior of the electronic device. FIG. 6A illustrates the housing 610 in the unfolded state and FIG. 6B illustrates the housing 610 in the folded state. The housing 610 may include a first housing 611 and a second housing 612 rotatably connected to the first housing 611.

The main display 620 may be disposed on the first surface of the housing 610. The main display 620 may be provided to be transformed according to a state of the housing 610. For example, when the housing 610 is folded, the main display 620 may be folded in response to the shape of the housing 610. The main display 620 may be turned on when the housing 610 is switched from the folded state to the unfolded state. The main display 620 may be turned off when the housing 610 is switched from the unfolded state to the folded state.

In other embodiments, the optical proximity sensor 630 may be disposed in the housing 610 and may sense light entering the inside of the housing 610. The optical proximity sensor 630 may transmit, to the processor 660, information on the light entering the inside of the housing 610 through the first surface.

The sub-display 640 may be disposed on the second surface of the housing 610. The sub-display 640 may remain in an on-state when the housing 610 is in the folded state. The sub-display 640 may function as an always-on display (AOD). For example, the sub-display 640 may display at least one of time, a remaining battery amount, weather, or an image.

In various embodiments, the optical sensor 650 may sense light entering the inside of the housing 610 through the second surface. The optical sensor 650 may be a flicker sensor. The optical sensor 650 may include a plurality of light receiving elements (e.g., the plurality of light receiving elements 551*a*, 551*b*, 551*c*, and 551*d* of FIG. 5B) and a plurality of filters (e.g., the plurality of filters 560 of FIG. 5B). The optical sensor 650 may transmit the sensed light information to the processor 660.

The processor 660 may be electrically connected to the optical proximity sensor 630 and the optical sensor 650 and may obtain ambient light source information and ambient brightness information based on the light information received from the optical sensor 650. The processor 660 may obtain the ambient light source information. For example, the processor 660 may determine whether the ambient light source is sunlight, incandescent light, fluorescent light, or an LED. The processor 660 may obtain the ambient brightness information. For example, the processor 660 may determine a value of an intensity of illuminance of ambient brightness.

In various embodiments, the processor 660 may determine the ambient light source information. Sunlight, incandescent light, fluorescent light, or the LED may have different spectrum of wavelengths. The processor 660 may determine the ambient light source information based on an index value based on the light information measured by the optical sensor 650. For example, the optical sensor 650 may include a plurality of light receiving elements. Some of the plurality of light receiving elements may be covered by a filter and the others may not be covered by the filter. The filter may pass, for example, light in a visible band. The processor 660 may calculate an amount of first light that a light receiving element, which is not covered by the filter, receives, an amount of second light that a light receiving element, which is covered by the filter, receives, and an index obtained by subtracting the amount of second light from the amount of first light, and may determine a type of a light source based on a ratio of the index to the amount of first light.

In some embodiments, the processor 660 may determine the ambient brightness information. The processor 660 may measure a frequency of the light information measured by the optical sensor 650 by performing a fast Fourier transform (FFT). The processor 660 may determine the ambient brightness information based on the frequency of the light information. For example, the processor 660 may process data multiple times and may determine the ambient brightness information using an average value of data processing.

When the housing 610 is in the folded state, the optical proximity sensor 630 may be covered by the housing 610 and the optical sensor 650 may sense external light. When the housing 610 is in the folded state, the processor 660 may determine the ambient light source information and the ambient brightness information based on the light information received from the optical sensor 650 and may adjust the brightness of the sub-display 640.

Figure 7:
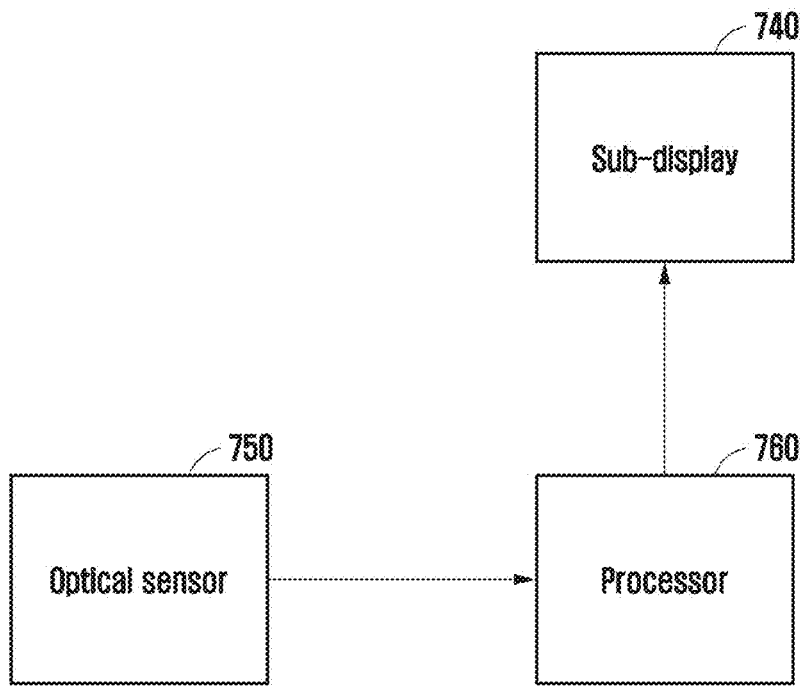
FIG. 7 is a block diagram schematically illustrating a clamshell-type electronic device according to an embodiment of the disclosure.

FIG. 7 is a block diagram schematically illustrating a clamshell-type electronic device according to an embodiment of the disclosure.

Referring to FIG. 7, the electronic device may include an optical sensor 750, a processor 760, and a sub-display 740. Light information sensed by the optical sensor 750 may be transmitted to the processor 760. Based on the light information, the processor 760 may determine the ambient light source information and the ambient brightness information. The processor 760 may adjust the brightness of the sub-display 740 based on at least one of the ambient light source information and the ambient brightness information.

In various embodiments, the optical sensor 750 may have a flicker-sensing function. The optical sensor 750 may be referred to as an ambient light sensor (ALS) or a flicker sensor. The optical sensor 750 and the processor 760 may measure a frequency for external lighting to remove a flicker phenomenon by the external lighting.

The optical sensor 750 may include a microcontroller unit (MCU). The optical sensor 750 may determine the frequency for the external lighting by performing FFT.

In various embodiments, the optical sensor 750 may not include the MCU. The optical sensor 750 may not autonomously determine the frequency for the external lighting and may transmit the light information to the processor 760. The processor 760 may determine the frequency for the external lighting by performing FFT. When a separate MCU is not included in the optical sensor 750, the size of the optical sensor 750 may be relatively small.

Figure 8:
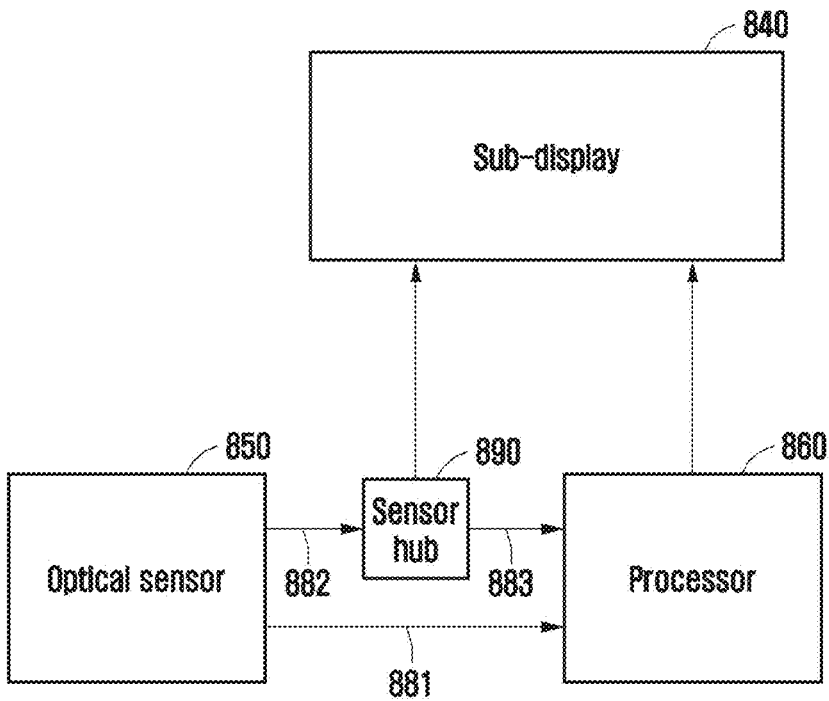
FIG. 8 is a block diagram schematically illustrating a clamshell-type electronic device according to an embodiment of the disclosure.

FIG. 8 is a block diagram schematically illustrating a clamshell-type electronic device according to an embodiment of the disclosure.

Referring to FIG. 8, the electronic device may include a sub-display 840, an optical sensor 850, a processor 860, and a sensor hub 890.

The sensor hub 890 may be electrically connected to the optical sensor 850, the sub-display 840, and the processor 860 and may obtain ambient light source information and ambient brightness information based on the light information received from the optical sensor 850. The sensor hub 890 may adjust the brightness of the sub-display 840. For example, when the ambient brightness is relatively bright, the sensor hub 890 may increase the brightness of the sub-display 840, and when the ambient brightness is relatively dark, the sensor hub 890 may decrease the brightness of the sub-display 840.

In various embodiments, when a camera (e.g., the camera module 180 of FIG. 1) and the processor 860 do not operate, the sensor hub 890 may adjust the brightness of the sub-display 840 independently. For example, when the processor 860 is in an off-state, the sensor hub 890 may adjust the brightness of the sub-display 840. When the processor 860 is in the off-state, since the sensor hub 890 is able to adjust the brightness of the sub-display 840, the electronic device may implement an AOD function of the sub-display 840 in a low power mode. The sensor hub 890 may calculate illuminance.

In other embodiments, the electronic device may include a first channel 881 that connects the optical sensor 850 to the processor 860, a second channel 882 that connects the optical sensor 850 to the sensor hub 890, and a third channel 883 that connects the sensor hub 890 to the processor 860. The first channel 881 may transmit information about light sensed by the optical sensor 850 to the processor 860. The second channel 882 may transmit the information about light sensed by the optical sensor 850 to the sensor hub 890. The third channel 883 may transmit information temporarily stored in the sensor hub 890 to the processor 860.

Figure 9:
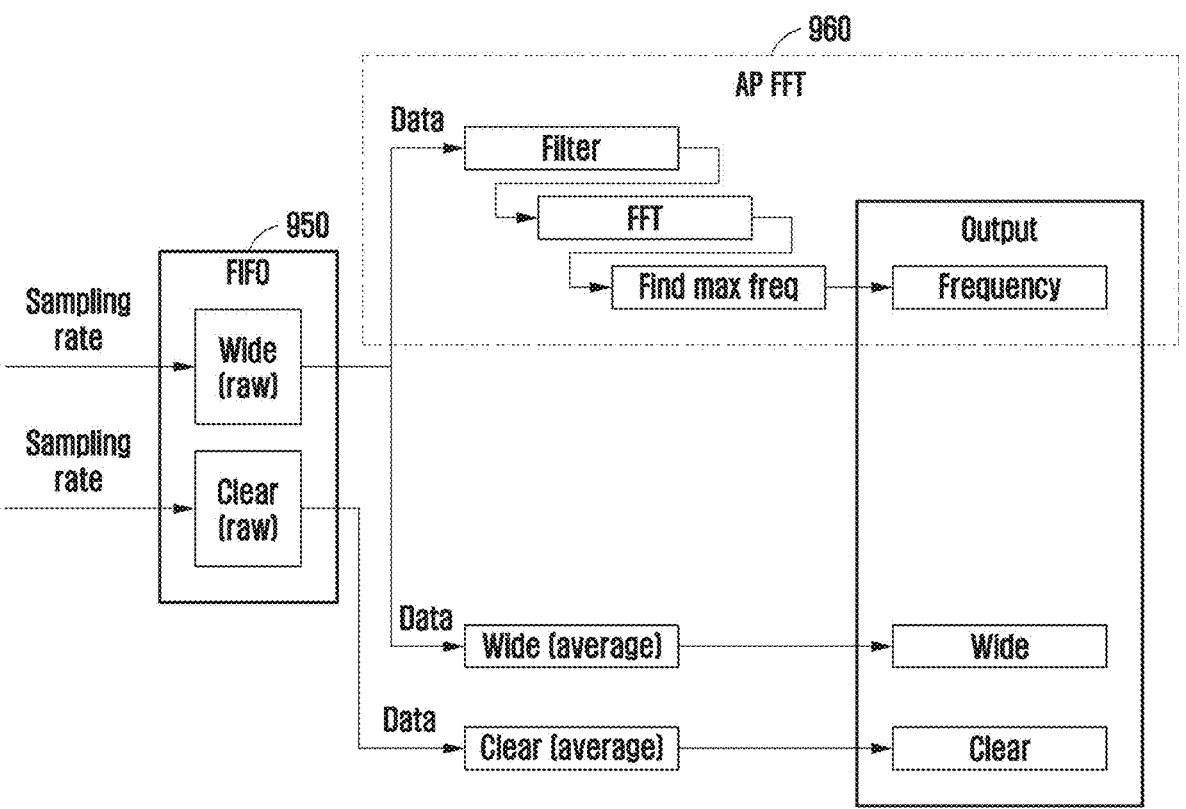
FIG. 9 is a block diagram schematically illustrating a process of measuring a frequency by a clamshell-type electronic device according to an embodiment of the disclosure.

FIG. 9 is a block diagram schematically illustrating a process of measuring a frequency by a clamshell-type electronic device according to an embodiment of the disclosure.

Referring to FIG. 9, an optical sensor may include a first in, first out (FIFO) part 950. A processor 960 may be separated from the FIFO part 950 of the optical sensor. The processor 960 may include a controller unit that performs FFT. The processor 960 may sense frequency information of a light source of 10 Hz to 500 Hz.

Figure 10:
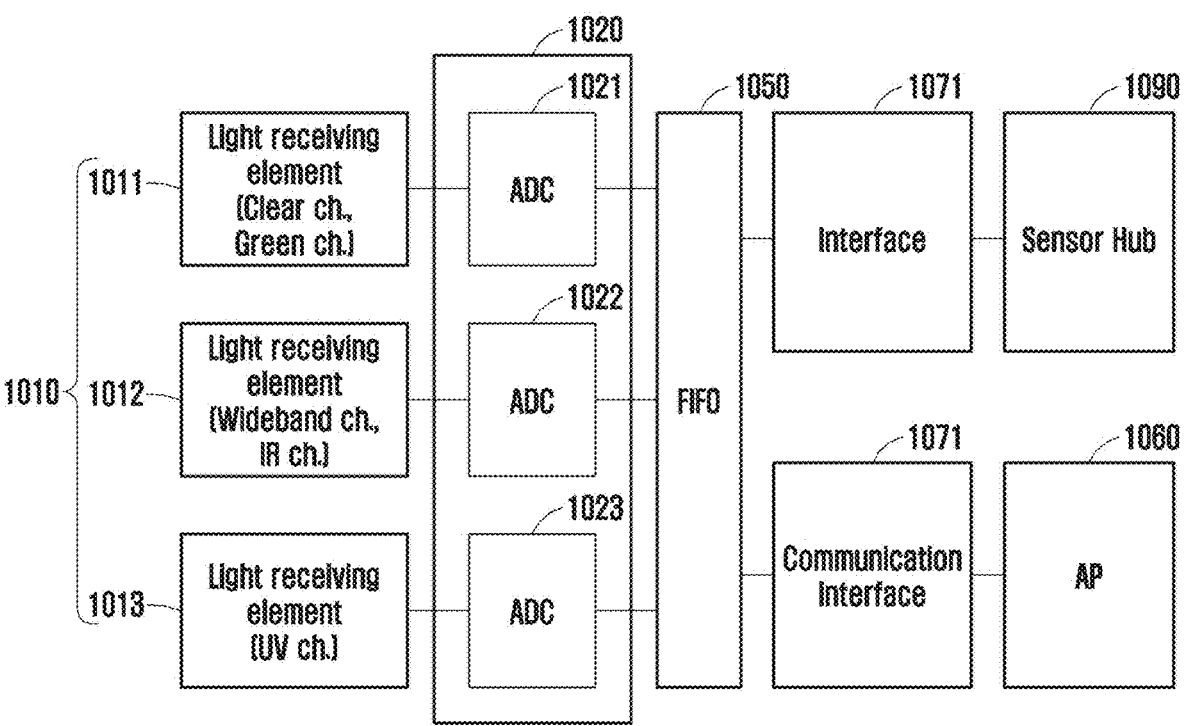
FIG. 10 is a block diagram schematically illustrating a clamshell-type electronic device according to an embodiment of the disclosure.

FIG. 10 is a block diagram schematically illustrating a clamshell-type electronic device according to an embodiment of the disclosure.

Referring to FIG. 10, an electronic device may include a plurality of light receiving elements 1010, an analog-to-digital converter (ADC) 1020, a FIFO part 1050, an interface 1071, a processor 1060, and a sensor hub 1090.

In various embodiments, the plurality of light receiving elements 1010 may include a first light receiving element 1011, a second light receiving element 1012, and a third light receiving element 1013. The first light receiving element 1011 may receive, for example, visible light. The second light receiving element 1012 may receive, for example, both visible light and infrared light, or only the infrared light. The third light receiving element 1013 may receive ultraviolet light. The number of the plurality of light receiving elements 1010 and an area from which each element receives light are not limited thereto.

In other embodiments, the ADC 1020 may be integrated as one and may be connected to the plurality of light receiving elements 1010. In another example, a plurality of ADCs 1020 may be provided. For example, the ADC 1020 may include a first converter 1021 connected to the first light receiving element 1011, a second converter 1022 connected to the second light receiving element 1012, and a third converter 1023 connected to the third light receiving element 1013.

Figure 11:
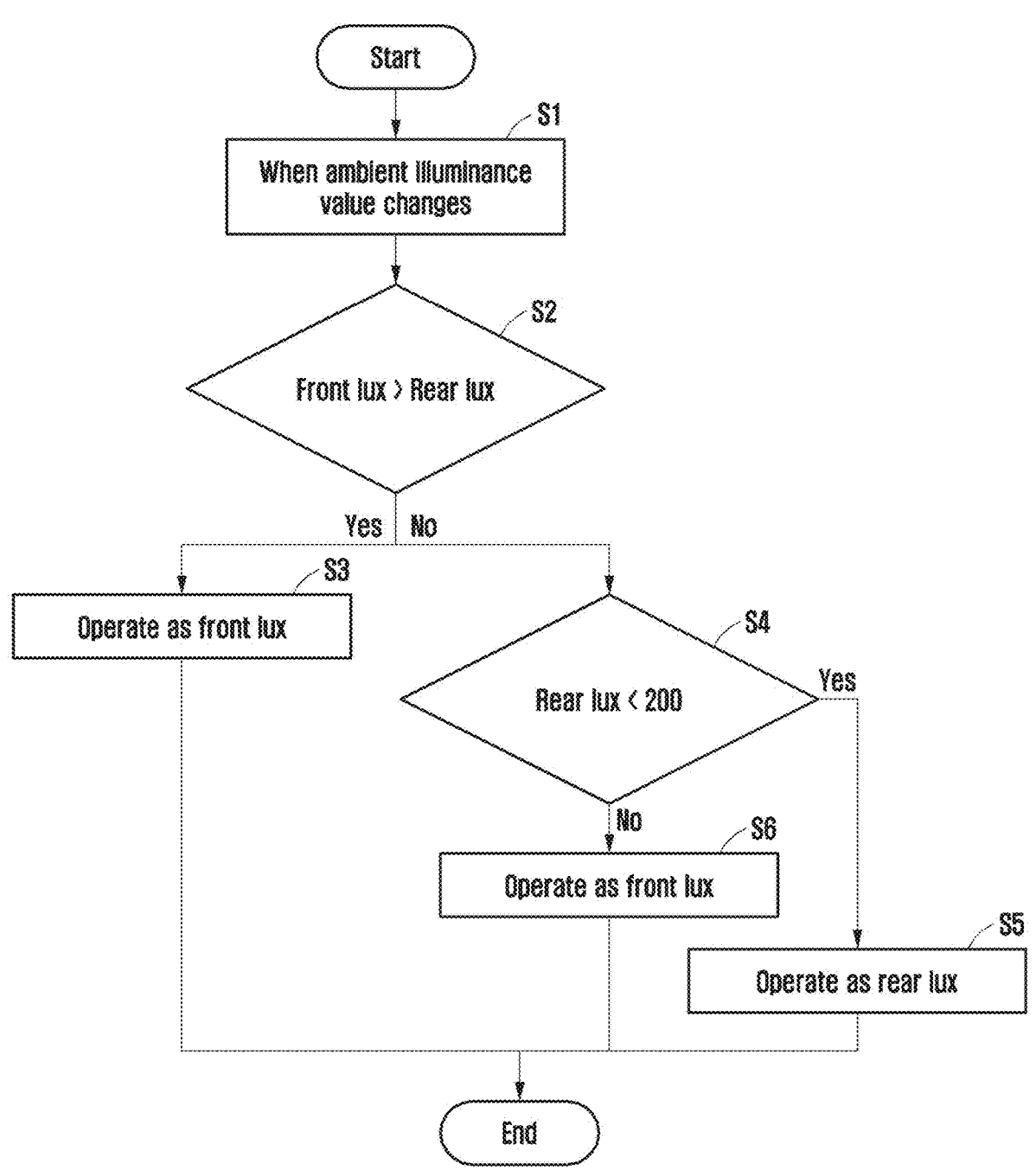
FIG. 11 is a flowchart schematically illustrating a process of using illuminance by a clamshell-type electronic device according to an embodiment of the disclosure.

FIG. 11 is a flowchart schematically illustrating a process of using illuminance by a clamshell-type electronic device according to an embodiment of the disclosure.

Referring to FIG. 11, the electronic device may adjust the brightness of a main display based on ambient brightness information, for example, illuminance information. A processor may adjust the brightness of the main display in the following order. The electronic device may determine front illuminance based on information about light sensed by an optical proximity sensor (e.g., the optical proximity sensor 630 of FIG. 6A) and may determine rear illuminance based on information about light sensed by an optical sensor (e.g., the optical sensor 650 of FIG. 6A).

In various embodiments, the processor may perform an operation S1 of detecting a change in an ambient illuminance value, an operation S2 of comparing the front illuminance with the rear illuminance, an operation S3 of utilizing the front illuminance, an operation S4 of comparing a value of the rear illuminance with a reference value, an operation S5 of utilizing the rear illuminance, and an operation S5 of utilizing the front illuminance.

In operation S1, the processor may detect a change in an ambient illuminance value. For example, the processor may detect a change in the brightness of light sensed by an optical proximity sensor (e.g., the optical proximity sensor 630 of FIG. 6A) and/or an optical sensor (e.g., the optical sensor 650 of FIG. 6A).

In operation S2, the processor may compare the front illuminance with the rear illuminance.

In operation S3, when the front illuminance is greater than the rear illuminance, the processor may utilize the front illuminance. In this case, utilizing the front illuminance may refer to adjusting a level of brightness of a main display based on the change in the front illuminance. For example, when the front illuminance decreases, the processor may relatively darken the brightness of the main display.

In operation S4, the processor may compare a value of the rear illuminance with a reference value. For example, when the rear illuminance is equal to or greater than the front illuminance, the processor may utilize the rear illuminance. For example, the reference value may be 200 lux. It shall be noted that the reference value is not limited thereto.

In operation S5, when the rear illuminance is less than 200 lux, the processor may adjust the brightness of the main display based on the rear illuminance.

In operation S6, when the rear illuminance is equal to or greater than 200 lux, the processor may adjust the brightness of the main display based on the front illuminance.

According to various embodiments, a clamshell-type electronic device capable of detecting a light source and illuminance may include a housing of which a state is switchable between a folded state and an unfolded state and which may include a common hole, a main display disposed on a first surface of the housing and transformable depending on the state of the housing, a sub-display disposed on a second surface of the housing, a camera disposed in the housing and including a flash, an optical proximity sensor disposed in the housing and configured to sense light entering an inside of the housing, an optical sensor disposed in the housing and including a plurality of light receiving elements configured to sense light entering the inside of the housing, and a processor electrically connected to the optical sensor and configured to obtain at least one of ambient brightness information and ambient light source information based on light information received from the optical sensor.

In various embodiments, the processor may adjust brightness of the sub-display based on the ambient brightness information.

In other embodiments, when the housing is in the folded state, the optical proximity sensor may be covered by the housing and the optical sensor may sense external light.

In various embodiments, the flash may emit light to an outside through the common hole and the optical sensor may sense light that passes through the common hole from the outside and enters the inside of the housing.

The electronic device may further include a filter configured to cover some of the plurality of light receiving elements.

In various embodiments, the processor may calculate an amount of first light that a light receiving element, which is not covered by the filter, of the plurality of light receiving elements receives and an amount of second light that a light receiving element, which is covered by the filter, receives, and an index obtained by subtracting the amount of the second light from the amount of the first light, and may obtain the amount light source information based on a ratio of the index to the amount of the first light.

The filter may pass light in a visible band among light received through the common hole.

In various embodiments, the processor may obtain the ambient brightness information based on frequency information of the light sensed by the plurality of light receiving elements.

In various embodiments, the electronic device may further include a sensor hub electrically connected to the optical sensor, the sub-display, and the processor and configured to obtain the ambient brightness information based on light information received from the optical sensor.

In some embodiments, the electronic device may further include a first channel connecting the optical sensor to the processor and configured to transmit light information sensed by the optical sensor, a second channel connecting the optical sensor to the sensor hub and configured to transmit light information sensed by the optical sensor, and a third channel connecting the sensor hub to the processor and configured to transmit light information sensed by the optical sensor.

In various embodiments, when the camera and the processor do not operate, the sensor hub may independently adjust the brightness of the sub-display.

In other embodiments, when the housing is in the unfolded state, the processor may adjust the brightness of the main display based on information sensed by the optical proximity sensor and the optical sensor.

In various embodiments, the display may perform AWB on an image obtained by the camera based on the ambient light source information.

The processor may determine a frequency of the light information by performing FFT.

In various embodiments, the processor may adjust the brightness of the main display by comparing light information measured by the optical proximity sensor with light information measured by the optical sensor.

According to various embodiments, a clamshell-type electronic device capable of detecting a light source and illuminance may include a housing of which a state is switchable between a folded state and an unfolded state and which may include a common hole, a main display disposed on a first surface of the housing and transformable depending on the state of the housing, a sub-display disposed on a second surface of the housing, an optical proximity sensor disposed in the housing and configured to sense light entering an inside of the housing, an optical sensor disposed in the housing and including a plurality of light receiving elements configured to sense light entering the inside of the housing, and a processor electrically connected to the optical sensor and configured to obtain at least one of ambient brightness information and ambient light source information based on light information received from the optical sensor.

In some embodiments, the processor may adjust brightness of the sub-display based on the ambient brightness information.

In various embodiments, the electronic device may further include a filter configured to cover some of the plurality of light receiving elements.

In other embodiments, the processor may calculate an amount of first light that a light receiving element, which is not covered by the filter, of the plurality of light receiving elements receives and an amount of second light that a light receiving element, which is covered by the filter, receives, and an index obtained by subtracting the amount of the second light from the amount of the first light, may obtain the amount light source information based on a ratio of the index to the amount of the first light, and may obtain the ambient brightness information based on frequency information of light sensed by the plurality of light receiving elements.

According to various embodiments, a clamshell-type electronic device capable of detecting a light source and illuminance may include a housing of which a state is switchable between a folded state and an unfolded state and which may include a common hole, a main display disposed on a first surface of the housing and transformable depending on the state of the housing, a sub-display disposed on a second surface of the housing, a camera disposed in the housing and including a flash, an optical proximity sensor disposed in the housing and configured to sense light entering an inside of the housing, an optical sensor disposed in the housing and including a plurality of light receiving elements configured to sense light entering the inside of the housing, a processor electrically connected to the optical sensor and configured to obtain at least one of ambient brightness information and ambient light source information based on light information received from the optical sensor, and a sensor hub electrically connected to the optical sensor, the sub-display, and the processor and configured to obtain the ambient light source information and the ambient brightness information based on the light information received from the optical sensor.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A clamshell-type electronic device capable of detecting a light source and illuminance, the clamshell-type electronic device comprising:

a housing of which a state is switchable between a folded state and an unfolded state and which comprises a common hole;

a main display disposed on a first surface of the housing and transformable depending on the state of the housing;

a sub-display disposed on a second surface of the housing;

a camera disposed in the housing and comprising a flash;

an optical proximity sensor disposed in the housing and configured to sense light entering an inside of the housing;

an optical sensor disposed in the housing and comprising a plurality of light receiving elements configured to sense light entering the inside of the housing;

memory storing one or more computer programs; and one or more processors communicatively coupled to the optical sensor and the memory, wherein the one or more computer programs include computer-executable instructions that, when executed by the one or more processors individually or collectively, cause the clamshell-type electronic device to:

obtain at least one of ambient brightness information and ambient light source information based on light information received from the optical sensor, and adjust a brightness of the main display by comparing light information of light entering the inside of the housing measured by the optical proximity sensor with light information of light entering the inside of the housing measured by the optical sensor, and wherein, when the light information of light entering the inside of the housing measured by the optical proximity sensor is greater than the light information of light entering the inside of the housing measured by the optical sensor, use the light information of light entering the inside of the housing measured by the optical proximity sensor to adjust the brightness, and wherein, when the light information of light entering the inside of the housing measured by the optical proximity sensor is less than or equal to than the light information of light entering the inside of the housing measured by the optical sensor, compare the light information of light entering the inside of the housing measured by the optical sensor to a reference value and adjust the brightness based upon the comparison of the light information of light entering the inside of the housing measured by the optical sensor to the reference value.

2. The clamshell-type electronic device of claim 1, wherein the one or more computer programs further include computer-executable instructions that, when executed by the one or more processors individually or collectively, cause the clamshell-type electronic device to adjust brightness of the sub-display based on the ambient brightness information.

3. The clamshell-type electronic device of claim 2, wherein, when the housing is in the folded state, the optical proximity sensor is covered by the housing and the optical sensor senses external light.

4. The clamshell-type electronic device of claim 3, wherein the flash emits light outside through the common hole and the optical sensor senses light that passes through the common hole from the outside and enters the inside of the housing.

5. The clamshell-type electronic device of claim 4, further comprising:
a filter configured to cover some of the plurality of light receiving elements.

6. The clamshell-type electronic device of claim 5, wherein the one or more computer programs further include computer-executable instructions that, when executed by the one or more processors individually or collectively, cause the clamshell-type electronic device to:
calculate an amount of first light that a light receiving element, which is not covered by the filter, of the plurality of light receiving elements receives and an amount of second light that a light receiving element, which is covered by the filter,
receives, and an index obtained by subtracting the amount of the second light from the amount of the first light, and
obtain the ambient light source information based on a ratio of the index to the amount of the first light.

7. The clamshell-type electronic device of claim 5, wherein the filter passes light in a visible band among light received through the common hole.

8. The clamshell-type electronic device of claim 4, wherein the one or more computer programs further include computer-executable instructions that, when executed by the one or more processors individually or collectively, cause the clamshell-type electronic device to obtain the ambient brightness information based on frequency information of the light sensed by the plurality of light receiving elements.

9. The clamshell-type electronic device of claim 1, further comprising:
a sensor hub electrically connected to the optical sensor, the sub-display, and the one or more processors and configured to obtain the ambient brightness information based on light information received from the optical sensor.

10. The clamshell-type electronic device of claim 9, further comprising:
a first channel connecting the optical sensor to the one or more processors and configured to transmit light information sensed by the optical sensor;
a second channel connecting the optical sensor to the sensor hub and configured to transmit light information sensed by the optical sensor; and
a third channel connecting the sensor hub to the one or more processors and configured to transmit light information sensed by the optical sensor.

11. The clamshell-type electronic device of claim 9, wherein, when the camera and the one or more processors do not operate, the sensor hub is configured to independently adjust a brightness of the sub-display.

12. The clamshell-type electronic device of claim 9, wherein, when the housing is in the unfolded state, the one or more computer programs further include computer-executable instructions that, when executed by the one or more processors individually or collectively, cause the clamshell-type electronic device to adjust the brightness of the main display based on information sensed by the optical proximity sensor and the optical sensor.

13. The clamshell-type electronic device of claim 9, wherein the main display performs auto white balance (AWB) on an image obtained by the camera based on the ambient light source information.

14. The clamshell-type electronic device of claim 1, wherein the one or more computer programs further include computer-executable instructions that, when executed by the one or more processors individually or collectively, cause the clamshell-type electronic device to determine a frequency of the light information by performing fast Fourier transform (FFT).

* * * * *